United States Patent [19]
Capuano

[11] 3,713,776
[45] Jan. 30, 1973

[54] AUTOMATIC MERCURY MONITOR
[75] Inventor: Italo A. Capuano, Orange, Conn.
[73] Assignee: Olin Corporation
[22] Filed: Sept. 28, 1970
[21] Appl. No.: 75,927

[52] U.S. Cl. ............................................. 23/253 R
[51] Int. Cl. ........................................... G01n 31/00
[58] Field of Search..23/230, 232, 253, 254, 230 PC; 235/151.12, 151.13, 151.35

[56] References Cited

OTHER PUBLICATIONS

Dill, M. S., A.E.C. Research and Development Report Y-1572 (1967).
Rathje, A. D., American Industrial Hygiene Association Journal, Vol. 30, pp. 126-132 (1969).
Hatch, R. et al., Analytical Chemistry, Vol. 40, pp. 2085-2087 (1968).
Kuznetsov, Y. N. et al., Analytical Abstracts, Vol. 14, No. 55 (1967).

Primary Examiner—Morris O. Wolk
Assistant Examiner—R. M. Reese
Attorney—Gordon D. Byrkit, Donald F. Clements, Thomas P. O'Day, Eugene Zagarella, Jr. and F. A. Iskander

[57] ABSTRACT

Apparatus and method for analyzing fluid streams for their content of elemental and ionic mercury even in the presence of other contaminants, for example, elemental or available chlorine. The sample is automatically measured and treated with aqueous stannous chloride reagent. The resulting elemental mercury is transferred to a photometric detector and the results are indicated and/or recorded automatically, accurately and rapidly. The apparatus and method are especially useful in the control of mercury contamination in the environment and also for monitoring chemical process streams.

3 Claims, 3 Drawing Figures

AUTOMATIC MERCURY MONITOR

This invention relates to a method and apparatus for continuous, automatic analysis of a fluid for its content of mercury. The fluid is suitably gaseous or liquid and the liquids are suitably aqueous. The mercury is suitably in the form of liquid mercury or vapor or dissolved mercury or in any other form reducible to metallic mercury by aqueous stannous chloride. The fluid is suitably a flowing stream or discrete portions.

Aqueous liquids have previously been analyzed manually for mercury, reducing it to metal with stannous chloride, vaporizing the mercury and measuring photometrically the intensity of its 2,537 Angstrom units spectral line. See Dill, U.S. Atomic Energy Commission, Report No. Y–1572, issued Mar. 28, 1967 and Rathje, American Industrial Hygiene Association Journal 30, 126–132 (1969).

The method and apparatus of this invention is useful for determining automatically the mercury content of air or other gases discharged to the atmosphere or aqueous streams. These may be gaseous streams or aqueous streams discharged to underground storage or to surface drainage. Mercury contaminated streams originate in locations where mercury or its compounds are used in manufacturing various products, for example, in chlor-alkali plants operating mercury cells, felt manufacturing plants, plants for manufacturing mercury-containing pesticides, instruments, lamps, batteries and medicinals.

A major difficulty in controlling mercury contamination of the environment in industrial areas has been the lack of automatic apparatus capable of analyzing for mercury quickly, accurately and continuously. Some proposed methods and apparatus are not suited for use in contaminated environments where, for example, chlorine gas adversely affects the function and structure of the apparatus or where other contaminants lead to false results. When mercury, as a contaminant, is present as the element or as salts, for example, as chloride salts, instruments employing pyrolytic reduction do not accurately respond to such mercury chloride salts. Because mercury is frequently present in various forms, fluid samples cannot give accurate analyses when passed directly into many of the devices available for mercury analysis. This difficulty is overcome according to the present invention by converting the various forms of mercury to elementary mercury chemically and measuring its amount using instruments highly sensitive to the vapor of elementary mercury. The method and apparatus of the present invention is useful and accurate for analysis of samples containing other contaminants, particularly elemental or available chlorine.

The method and apparatus of this invention removes and measures a finite sample of the fluid to be analyzed and processes the sample automatically to the finally indicated and/or recorded result. The sample is suitably removed and measured from a supply which may be moving or quiescent, i.e., it may be a flowing stream or a stationary body of fluid brought to the place of analysis. It is, however, a feature of the apparatus of the present invention, that it is portable and is suitably transported to the place where the fluid to be analyzed is located. Advantageously, the sample points used in conjunction with the method and apparatus of this invention are located sufficiently upstream of a disposal point to permit remedial steps to be taken to correct contamination before discharge of the stream under test when the method of this invention indicates the necessity of such action.

Mercury in the fluids analyzed is determined accurately and quickly by the method and apparatus of this invention when the mercury is present as one or more of the entities, $Hg^0$, $Hg^{+1}$ or $Hg^{+2}$. The entity $Hg^0$ represents elemental mercury. It is sometimes present as vapor in gases or as liquid, in aqueous liquids, usually dispersed or emulsified as droplets of mercury. The entity $Hg^{+1}$ represents monovalent ionic mercury usually present in aqueous liquids as dissolved or suspended salts of mercurous mercury or as solids dispersed in a gas. The entity $Hg^{+2}$ represents divalent ionic mercury usually present in aqueous liquids as dissolved or suspended salts of mercuric mercury or as solids dispersed in a gas. These ionic forms of mercury are reduced by aqueous stannous chloride reagent and analyzed according to the method and in the apparatus of this invention.

The method and apparatus of this invention are also suitably used to measure the effectiveness of operation of mercury-removing or mercury-introducing machines, processes and systems by measuring the mercury content of input and output streams.

The method of the present invention automatically monitors a fluid for the total content of mercury when it is present therein as at least one of the entities, $Hg^0$, $Hg^{+1}$ and $Hg^{+2}$ by programming and mechanically performing successively and repetitively the operations of:

a. providing aqueous stannous chloride reagent in a reagent storage zone;

b. removing from said reagent storage zone a reagent portion of predetermined amount and transferring said reagent portion to a scrubbing zone;

c. scrubbing said reagent portion in said scrubbing zone with a gaseous carrier;

d. separating said gaseous carrier from the resulting aqueous liquid in said scrubbing zone;

e. transferring said carrier to a measuring zone and automatically adjusting the base line reading to zero;

f. providing a fluid to be monitored for mercury present therein;

g. removing from said fluid a sample of predetermined amount and transferring said sample to said scrubbing zone;

h. scrubbing the resulting mixture of sample and reagent in said scrubbing zone with said gaseous carrier;

i. separating said gaseous carrier from the resulting aqueous liquid in said scrubbing zone;

j. transferring said carrier to said measuring zone and photometrically measuring the quantity of mercury in said carrier;

k. indicating the quantity of mercury in said carrier relative to the predetermined amount of said sample.

The apparatus of the present invention provides means for performing the recited operations and comprises:

a. programming means for mechanically activating and deactivating successively and repetitively:

b. means for removing from a fluid a sample of predetermined amount and for transferring said sample to a scrubbing zone;
c. means for circulating aqueous stannous chloride reagent cyclically from a reagent storage zone through a reagent valve and through a reagent measuring zone and return to said reagent storage zone;
d. means for removing from said circulating reagent a predetermined amount of said aqueous reagent and for transferring said amount of aqueous reagent to said scrubbing zone;
e. means for scrubbing the mixture in said scrubbing zone with a gaseous carrier;
f. means for separating said gaseous carrier containing mercury vapor from the resulting aqueous liquid in said scrubbing zone;
g. means for transferring said carrier containing mercury vapor to a measuring zone;
h. photometric means for measuring the quantity of mercury in said carrier;
i. means for indicating the quantity of mercury in said carrier relative to the predetermined amount of said sample.

CALIBRATION

Suitably, mercury-free gas and reference gases containing known amounts of mercury are introduced and analyzed in order to zero the detector and calibrate the system for gas analyses. Aqueous solutions of known mercury content are used to zero the detector and calibrate the system for liquid analyses. Care must be exercised to avoid the introduction of carrier gas containing unknown or variable amounts of mercury which would vitiate the determination. Mercury-free carrier gas is suitably provided from a source of pure, compressed gas, advantageously, from a cylinder of compressed gas. Alternatively, air is suitably brought to the apparatus from a remote, uncontaminated plant location. The inert gaseous carrier is suitably air, nitrogen, hydrogen, helium, argon or other gases inert to stannous chloride and non-absorbing in the ultraviolet region. The inert gases also containing minor amounts of contaminants, e.g., chlorine, are suitable.

Suitable and preferred aqueous stannous chloride reagent is a 5 percent solution of analytical grade $SnCl_2 \cdot 2H_2O$ in 1.2 N hydrochloric acid. However, the composition of the aqueous reagent is not critical between 0.2 and 20 percent of stannous chloride in hydrochloric acid from 0.1 to 10 N. Other suitable water-soluble stannous salts, for example, stannous sulfate are also usable. The preferred reagent is stable in the absence of air and is not significantly altered in the presence of air. A 50 ml. volume of aqueous reagent scrubbed at room temperature with 120 liters of air at a rate of 2 liters per minute contained 2.00 percent and 1.90 percent of stannous tin before and after the test. This simulates the air exposure of the reagent in the method and apparatus of this invention.

At start-up, a measured amount of aqueous stannous chloride reagent is transferred to a suitable scrubber. Mercury-free carrier is bubbled through the liquid at a constant rate and is transferred to the detector. The detector is then automatically zeroed by a servomechanism under the control of the programmer.

ANALYSIS OF GASES

When the fluid sample if gaseous, it suitably flows continuously at the same rate through the system as used in the calibration. The flow rate is maintained constant by vacuum and valve means and is suitably at about 2 liters per minute. However, the absolute value of the flow rate is not critical between about 0.1 and 10 liters per minute using a reagent volume of preferably 50 ml. but suitably from 10 to 100 ml.

The detector is zeroed using aqueous stannous chloride reagent and mercury-free air.

A series of gas samples are analyzed and on completion of each series or at any other desirable interval, the liquid is discharged from the scrubber and replaced by a fresh, measured amount of aqueous stannous chloride reagent to start a new cycle of analyses.

Elemental mercury present in the sample gas or formed in the scrubber by reduction of mercury compounds by the stannous chloride is vaporized in the gaseous stream and carried to the photometric detector which comes to a steady analytical result as equilibrium is established in the system. The final analytical result is suitably recorded, if desired. When gas samples contain high amounts of mercury, above the linear range of the detector, additional gaseous carrier is suitably introduced to dilute the sample to within the linear range of the detector.

A plurality of gaseous sample points are suitably selected serially by a programmer and the results recorded on a continuous chart. Each gaseous sample point is repeatedly sampled and analyzed at intervals determined by the number of such points multiplied by the time required for each analysis. Ordinarily, when shifting from one sample point to the next, about 3 minutes is required for equilibrium to be established in the system and an accurate analysis to be reported by the detector.

ANALYSIS OF LIQUIDS

When the fluid sample is liquid, it suitably flows continuously through the sampling and measuring means. When the detector has been automatically zeroed, using stannous chloride reagent as described above, a measured sample is removed from the flowing stream, transferred to the scrubber and mixed with the measured amount of aqueous stannous chloride reagent. Ionic mercury in the sample is converted substantially instantaneously to elemental mercury. Elementary mercury is not affected by the reagent. A stream of carrier gas transports the mercury vapor through a photometric analyzer and out under the influence of reduced pressure. The analysis is indicated by the detector and is suitably recorded. A plurality of liquid sample points are suitably selected serially by the programmer and analyzed. Each analysis requires about 3 minutes and each analysis uses a fresh portion of aqueous stannous chloride reagent.

APPARATUS

The measurement and flow of sample, carrier gas and reagent are directed by any suitable programmer-operated valve having a suitable number of ports. One commercially available valve suitable for use as sample valve and reagent valve in the apparatus of this invention is the LG–6 sliding insert valve No. W 122437 of Beckman Instruments, Inc., but any other suitable valve will serve. Advantageously, such valves are fabricated of "Kel-F" or other suitable plastic parts and the ports and other fluid-carrying passages are lined with plastic. These valves suitably have a plurality of ports sufficient to perform the functions desired and may be from 2 to 10. The 6-port valves are suitable for sample and reagent valves in the apparatus of the present invention. Other valves in the system usually have two or three ports.

A terminal vacuum is generated and applied to induce the flow of fluids through the system. The vacuum generator is under control of the programmer and is activated when analyses begin and continues until analyses are completed. Suitably an exit pressure of 740 ± 10 mm. is maintained when the inlet lines are at sea level atmospheric pressure. Alternatively, atmospheric pressure at the exit and superatmospheric pressure at the inlet are suitable, maintaining differential pressures of about 10 to 30 mm.

DETECTOR

One suitable detector is the DuPont 400 photometric analyzer which is suitable for use with standard millivolt, self-balancing recorders having unbalanced impedance over 10,000 ohms. Analyzer output impedance is up to 20,000 ohms. Power at 110 volts and 60 Hertz is supplied. A suitable recorder is Leeds and Northrup Speedomax H with a range of 0 to 10 millivolts. Other suitable instruments are available.

The preferred detector has an ultraviolet light generator at one end which illuminates a one-meter tube through which carrier gas passes. Mercury vapor in the gas absorbs the 2,537 Angstrom unit wave length and reduces the intensity of the light at the other end of the tube where a photocell is located. The current passing through the photocell is inversely proportional to the amount of mercury vapor in the tube.

PROGRAMMER

Any suitable programmer is useful in the method and apparatus of this invention. Advantageously, the programmer incorporates selector means whereby any of a plurality of sample sources are activated to provide a sample for analysis according to the method of this invention. Suitably the programmer is a timer adapted to close and open circuits in sequence for selected periods of time, to activate and shut down the vacuum terminally applied to the system, to activate and shut down the aqueous reagent circulating pump, to open and close valves which permit the flow of measured amounts of reagent, sample and, when desired, inert diluent gas through the system and to activate and shut down the detector and recorder-indicator. Programmers are commercially available which are suitably adjustable to provide the desired sequence of operations. One suitable programmer is No. 520 manufactured by Beckman Instruments Inc. but other commercial devices are suitable.

DRAWINGS

FIG. 1 illustrates a system of the invention capable of analyzing both liquid and gaseous materials but it is to be understood that a system capable of analyzing only one of such fluids is constructed omitting parts specifically for the other of such fluids. Thus, the system for analyzing liquids suitably omits gas sampling means while the system for analyzing gases suitably omits measuring means for liquid samples. FIG. 1 shows chemical flow lines but omits electrical lines shown in FIG. 2.

Figure 1:
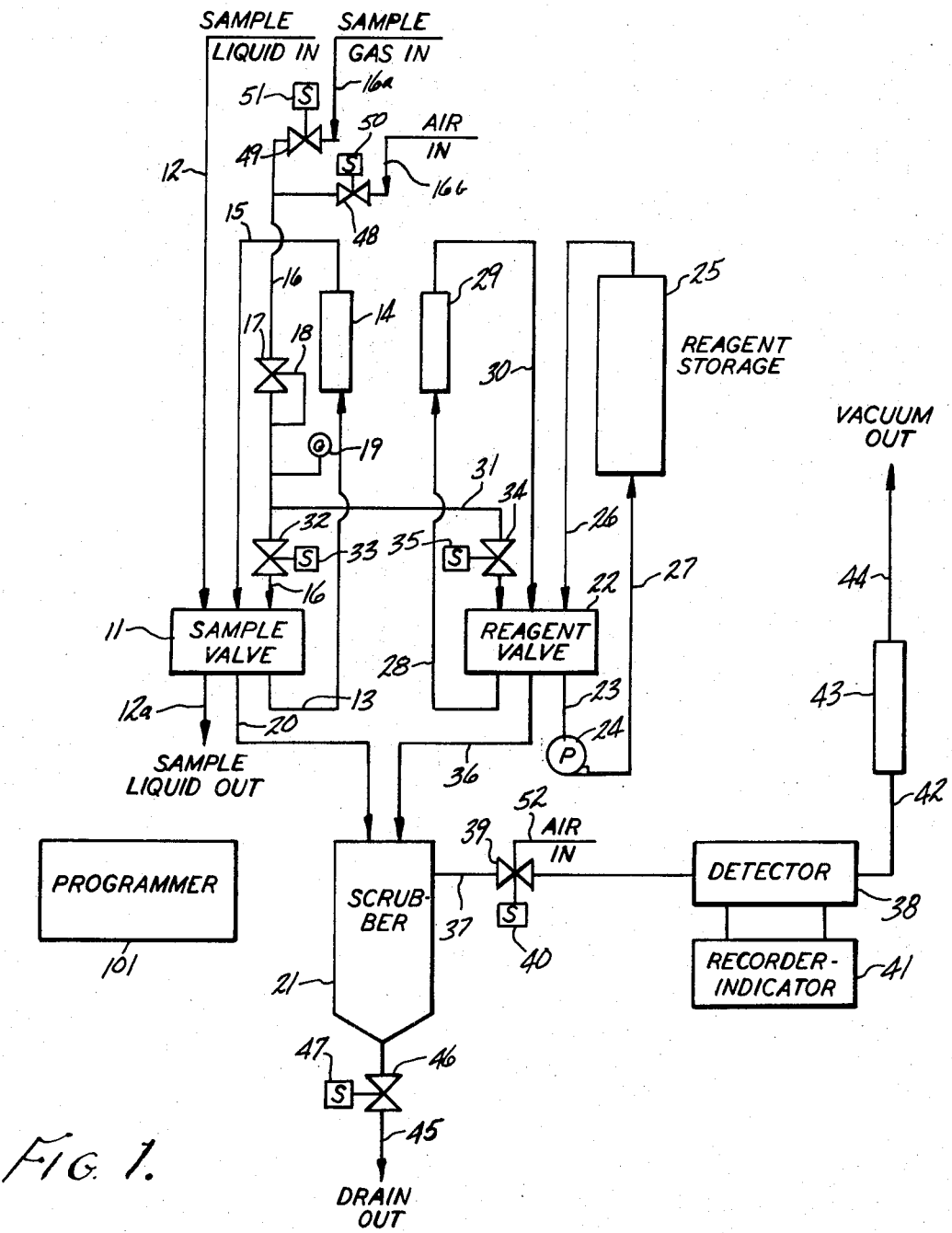
Figure 2:
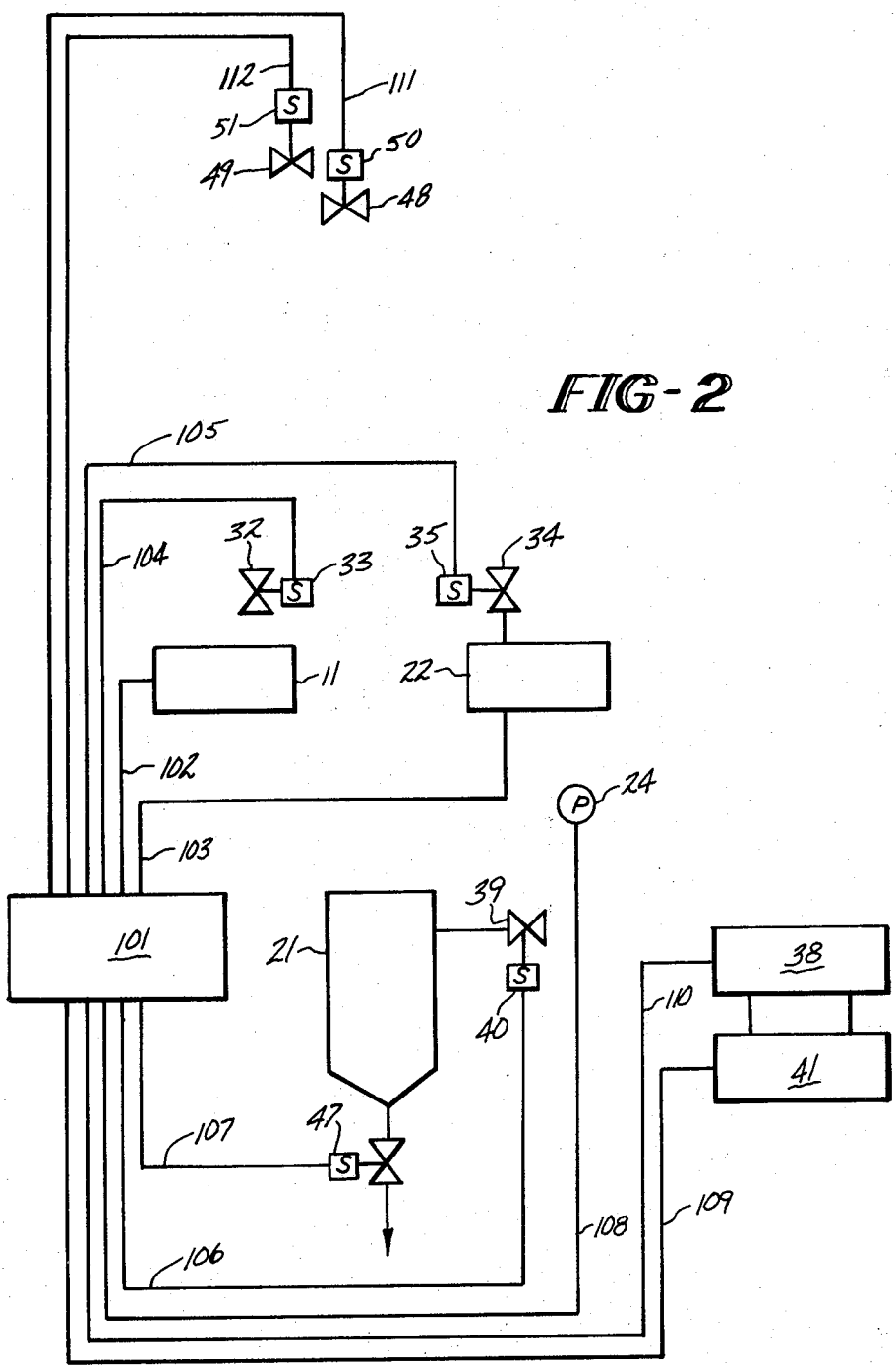
FIG. 2 shows the electrical system for controlling functions of the corresponding elements of FIG. 1 and omits the chemical flow lines.

FIGS. 1 and 2, lines 16, 16a and 16b are provided for introducing air and sample gas into the system through valves 48 and 49, operated by solenoids 50 and 51, respectively, under control of programmer 101 via lines 111 and 112 respectively. Sufficient vacuum is applied via line 44 to draw the gases through the entire system. In analyzing a gas sample, the gas sample is transferred via line 16 controlled by the pressure regulator consisting of valve 17 and line 18 and through valve 32 operated by programmer 101 using line 104 to solenoid 33. Sample valve 11 is activated by programmer 101 via line 102 to permit flow of the gas from line 16 through line 20 to scrubber 21.

Pump 24 normally circulates aqueous reagent from reagent storage 25 to reagent valve 22 via line 26, through measuring device 29 via lines 28 and 30 and back to reagent storage 25 via lines 23 and 27. Programmer 101 operates via line 108 to shut down pump 24 and reagent valve 22 is operated to withdraw air from line 31 into line 28. Flow of air in line 31 is regulated by valve 34 operated by solenoid 35 under control of programmer 101 via line 105. Air and the measured quantity of aqueous reagent is transferred via line 36 to scrubber 21.

In scrubber 21, the aqueous reagent reacts to reduce mercury ions to metallic mercury. The gas is separated from the aqueous portion of the contents of scrubber 21 and transferred via line 37 to detector 38. This transfer is controlled by valve 39 operated by solenoid 40 programmed by programmer 101 via line 106. Detector 38 indicates the amount of mercury in the air carrier relative to the predetermined amount of original sample and advantageously records the result by means of connected recorder-indicator 41. Detector 38 operates on a flow of gas, which is exhausted via line 42 through flowmeter 43 under the influence of vacuum applied via line 44. The complete analysis from time of sampling to time of indicating the result requires about 6 minutes.

One charge of aqueous reagent to scrubber 21 suffices for automatic zeroing on a mercury-free gas stream and for a plurality of gas analyses after which the aqueous reagent is discharged. To do so, programmer 101 energies solenoid 40 via line 106 and opens valve 39 to admit air via line 52 and also energizes solenoid 47 via line 107 and opens valve 46, whereby the used aqueous reagent is discharged via line 45.

In analyzing liquids, gas sample line 16a is closed and air is supplied to reagent valve 22 via lines 16b and 31 through valve 34 controlled by programmer 101 operating solenoid 35 via line 105. Aqueous reagent is measured and delivered to scrubber 21 as described above. The instrument is auto-zeroed while mercury-free gas is bubbled through the reagent and passed through the detector. Sample valve 11 is operated by programmer 101 via programmer line 102. Liquid from line 12, in turn connected to a source (not shown) to be monitored for mercury content, flows via line 13 through sample measuring device 14 and returns via line 15 to sample valve 11 and discharges via line 12a. Operation of sample valve 11 directs the flow of liquid from line 12 to line 12a. Valve 11 also admits air from line 16 under the pressure indicated by gage 19 into line 13 and the measured sample and air are discharged via line 20 into scrubber 21 under influence of the terminal vacuum. Air flow into sample valve 11 is regulated by valve 32 operated by solenoid 33 under control of programmer 101 via programmer line 104. Mercury vapor produced from scrubber 21 is transported by the air stream to the detector and discharged as in the gas analyses. In preparation for the next analysis, the aqueous liquid in scrubber-separator 21 is discharged via line 45 by the procedure described for gas analysis. Because the liquid sample is mixed with the aqueous reagent, each analysis of liquid sample requires a fresh charge of aqueous reagent.

Figure 3:
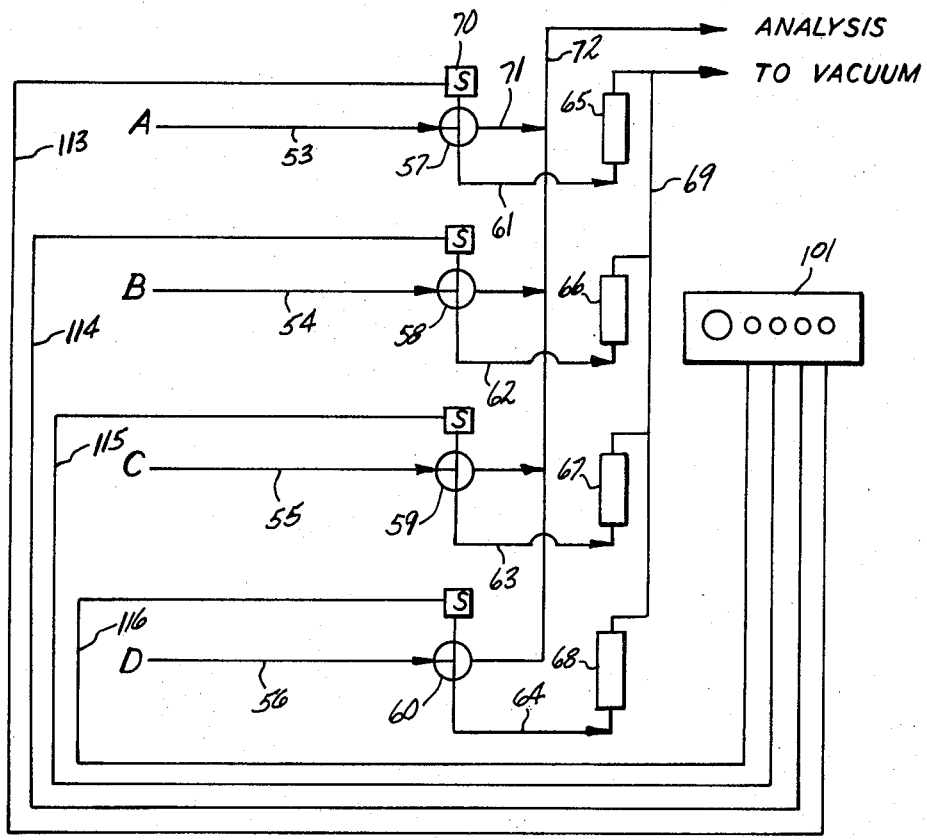
FIG. 3 shows the electrical system for control of several gaseous sampling points.

FIG. 3 shows a suitable sampler adapted for providing samples for analysis. Four sample points, A, B, C and D, are shown, it being understood that any desired number of sample points are suitably provided. Lines 53, 54, 55 and 56 are provided for gases or liquids as appropriate from sample points A, B, C and D respectively. Each line leads to a three-way valve, 57, 58, 59 and 60 which is turned, when the sample line is not in use for analysis, to flow the fluid via lines 61, 62, 63 and 64 respectively to flowmeters 65, 66, 67 and 68 respectively. The flowmeters serve to indicate that the fluid is flowing normally through unclogged lines and via line 69 to a vacuum discharge.

When programmer 101 automatically selects sample point A for analysis, valve 57 is turned by solenoid 70, actuated via line 113, to flow sample from line 53 through line 71 and 72 to analysis. When analysis of the sample is completed, valve 57 is returned to its previous position. Other sample points are similarly sampled.

EXAMPLE I

A system as shown in FIGS. 1 and 2 was set up using a DuPont 400 photometric analyzer with a 1-meter cell. Samples of water containing known amounts of mercury ion were analyzed using air carrier flow of 1.5 liters per minute, 10 ml. of aqueous stannous chloride reagent (5 percent $SnCl_2 \cdot 2H_2O$ in 1.2 N hydrochloric acid) and 10 ml. of water sample. Each analysis required about 3 minutes. Thus the recorder was calibrated with the results shown in Table I.

TABLE I

| Mercury, ppb | Recorder Units |
| --- | --- |
| 1 | 6 |
| 3 | 22 |
| 5 | 35 |
| 8 | 53 |
| 10 | 67 |

The tabulated results are substantially linear.

EXAMPLE II

Using the system shown in FIGS. 1 and 2 and the procedure described in Example I, 20 separate samples of water containing 10 parts per billion of mercury ion were analyzed. The results are shown in Table II.

TABLE II

| Sample No. | Mercury, ppb |
| --- | --- |
| 1 | 9.75 |
| 2 | 9.90 |
| 3 | 9.75 |
| 4 | 9.90 |
| 5 | 10.05 |
| 6 | 10.05 |
| 7 | 10.05 |
| 8 | 10.20 |
| 9 | 10.05 |
| 10 | 10.05 |
| 11 | 9.97 |
| 12 | 9.93 |
| 13 | 9.93 |
| 14 | 9.93 |
| 15 | 9.60 |
| 16 | 9.90 |
| 17 | 10.05 |
| 18 | 10.05 |
| 19 | 9.75 |
| 20 | 9.84 |

Average = 9.9349
Standard Deviation = ±0.1435
Error at 95 percent Confidence Level = ±0.0671

EXAMPLE III

A system according to FIGS. 1 and 2 for analysis of mercury in liquid plant effluent was set up for approximately quarter-hourly analyses. The analyses made on the hour for three successive days are shown in Table III.

TABLE III

| First Day | | Second Day | | Third Day | |
| --- | --- | --- | --- | --- | --- |
| Hour, a.m. | Hg, ppb | Hour, a.m. | Hg, ppb | Hour, a.m. | Hg, ppb |
| 1 | 0.3 | 1 | 0.2 | 1 | 0.8 |
| 2 | .2 | 2 | .2 | 2 | .2 |
| 3 | .3 | 3 | .5 | 3 | .3 |
| 4 | .6 | 4 | .6 | 4 | .5 |
| 5 | .4 | 5 | .3 | 5 | .3 |
| 6 | .6 | 6 | .5 | 6 | .4 |
| 7 | .3 | 7 | .2 | 7 | .2 |
| 8 | .5 | 8 | .4 | 8 | .3 |
| 9 | 1.0 | 9 | .4 | 9 | .5 |
| 10 | 0.3 | 10 | .3 | 10 | .3 |
| 11 | .1 | 11 | .3 | 11 | .1 |
| 12 | .1 | 12 | .5 | 12 | .4 |
| Hour, p.m. | Hg, ppb | Hour, p.m. | Hg, ppb | Hour, p.m. | Hg, ppb |
| 1 | 1.0 | 1 | 0.3 | 1 | 0.2 |
| 2 | 0.7 | 2 | .2 | 2 | .1 |
| 3 | .4 | 3 | .1 | 3 | .2 |
| 4 | .3 | 4 | .2 | 4 | .2 |
| 5 | .2 | 5 | .3 | 5 | .1 |
| 6 | .3 | 6 | .1 | 6 | .8 |
| 7 | .4 | 7 | .3 | 7 | 1.5 |
| 8 | .4 | 8 | .5 | 8 | 0.4 |
| 9 | .5 | 9 | .7 | 9 | .5 |
| 10 | .1 | 10 | .4 | 10 | .4 |
| 11 | .2 | 11 | .5 | 11 | .1 |
| 12 | .3 | 12 | .2 | 12 | .1 |

EXAMPLE IV

A system according to FIGS. 1 and 2 for analysis of mercury in liquid plant effluent was set up for approximately quarter-hourly analyses. The hourly analyses for one 24-hour period when mercury spills occurred are shown in Table IV. The first spillage occurred between 9 and 10 a.m. and the analysis at 10 a.m. was off the recorder chart, above 10 ppb. Correction began to show in the 1 p.m. analysis of 4.9 ppb but a second spillage again sent the analysis off the chart. Correction began to show again at 6 p.m. and normal operation was recorded from 8 p.m.

TABLE IV

| Hour, a.m. | Hg, ppb | Hours, p.m. | Hg, ppb |
|---|---|---|---|
| 1 | 0.5 | 1 | 4.9 |
| 2 | .4 | 2 | 10 + |
| 3 | .7 | 3 | 10 + |
| 4 | .9 | 4 | 10 + |
| 5 | .5 | 5 | 10 + |
| 6 | .4 | 6 | 2.5 |
| 7 | .4 | 7 | 7.8 |
| 8 | .5 | 8 | 0.7 |
| 9 | .4 | 9 | 0.9 |
| 10 | 10 + | 10 | 1.1 |
| 11 | 10 + | 11 | 1.4 |
| 12 | 10 + | 12 | 0.9 |

EXAMPLE V

Air samples for analysis were prepared containing various concentrations of mercury vapor with and without additionally 100 ppm. of chlorine gas. Liquid mercury was vaporized by passing air at a measured rate over a mercury pool in a chamber maintained at 27° C. and the resulting air stream was diluted by measured amounts of mercury-free air to provide samples of chlorine-free air containing known amounts of mercury vapor. Further air samples containing chlorine were prepared by admixing a third measured air stream containing chlorine with the mercury bearing streams to provide air samples containing various known amounts of mercury vapor and 100 ppm. of chlorine.

Serially, the various samples of air so-prepared were introduced into gas sample line 16a of a system corresponding to FIGS. 1 and 2 and the samples were serially analyzed. The data in Table V show that accurate mercury analyses were obtained in the presence or absence of 100 ppm. of chlorine.

TABLE V

Mercury vapor in air, mg./m.$^3$

| Sample No. | Chlorine-free | Sample No. | Chlorine, 100 ppm. |
|---|---|---|---|
| 1 | 0 | 1a | 0 |
| 2 | 0.1 | 2a | 0.098 |
| 3 | 0.25 | 3a | 0.26 |
| 4 | 0.34 | 4a | 0.33 |
| 5 | 0.40 | 5a | 0.42 |

What is claimed is:
1. Apparatus for monitoring a fluid for the content of mercury present therein which comprises:
   a. programming means for mechanically activating and deactivating successively and repetitively:
   b. means for removing from a fluid a sample of predetermined amount and for transferring said sample to a scrubbing zone;
   c. means for circulating aqueous stannous chloride reagent cyclically from a reagent storage zone through a reagent valve and through a reagent measuring zone and return to said reagent storage zone;
   d. means for removing from said circulating reagent a predetermined amount of said aqueous reagent and for transferring said amount of aqueous reagent to said scrubbing zone;
   e. means for scrubbing the mixture in said scrubbing zone with a gaseous carrier;
   f. means for separating said gaseous carrier containing mercury vapor from the resulting aqueous liquid in said scrubbing zone;
   g. means for transferring said carrier containing mercury vapor to a measuring zone;
   h. photometric means for measuring the quantity of mercury in said carrier;
   i. means for indicating the quantity of mercury in said carrier relative to the predetermined amount of said sample.

2. Apparatus as claimed in claim 1 further including means for admixing and proportioning gaseous carrier with said predetermined amount of aqueous reagent and for transferring the resulting mixture of said aqueous reagent and said carrier to said scrubbing zone.

3. Apparatus as claimed in claim 1 which additionally incorporates means for recording the quantity of mercury in said carrier relative to the predetermined amount of said sample.

* * * * *